United States Patent
Patridge

(10) Patent No.: US 9,480,200 B1
(45) Date of Patent: Nov. 1, 2016

(54) MULTI-BLADE LAWN MOWER CUTTING SYSTEM WITH OVERLAPPING CUTTING CIRCLES

(71) Applicant: Arthur Gary Patridge, Advance, NC (US)

(72) Inventor: Arthur Gary Patridge, Advance, NC (US)

( * ) Notice: Subject to any disclaimer, the term of this patent is extended or adjusted under 35 U.S.C. 154(b) by 0 days.

(21) Appl. No.: 15/008,173

(22) Filed: Jan. 27, 2016

(51) Int. Cl.
*A01D 34/00* (2006.01)
*A01D 34/66* (2006.01)
*A01D 101/00* (2006.01)

(52) U.S. Cl.
CPC ........... *A01D 34/664* (2013.01); *A01D 34/005* (2013.01); *A01D 34/66* (2013.01); *A01D 34/661* (2013.01); *A01D 2101/00* (2013.01)

(58) Field of Classification Search
CPC combination set(s) only.
See application file for complete search history.

(56) References Cited

U.S. PATENT DOCUMENTS

| | | |
|---|---|---|
| 2,682,142 A | 6/1954 | Clark |
| 4,502,268 A | 3/1985 | Kulak |
| 4,711,074 A | 12/1987 | Jetzinger |
| 4,916,887 A | 4/1990 | Mullet et al. |
| 5,085,044 A | 2/1992 | Freier, Jr. et al. |
| 5,109,656 A | 5/1992 | Zimmer |
| 5,133,176 A | 7/1992 | Baumann et al. |
| 5,605,032 A | 2/1997 | Gantzer |
| 5,809,765 A | 9/1998 | Hastings et al. |
| 5,890,354 A | 4/1999 | Bednar |
| 5,894,717 A | 4/1999 | Yamashito et al. |

FOREIGN PATENT DOCUMENTS

| | | |
|---|---|---|
| DE | 2927075 A1 | 1/1981 |
| DE | 3719297 A1 | 12/1988 |
| GB | 2083736 A | 3/1982 |
| GB | 2490511 B | 2/2015 |
| NL | 8601559 A | 1/1988 |
| WO | 8402054 | 6/1984 |

*Primary Examiner* — Alicia Torres
(74) *Attorney, Agent, or Firm* — Kilpatrick Townsend & Stockton LLP

(57) ABSTRACT

A multi-blade mower includes at least two spindles spaced apart from each other. In one example implementation, two blades are mounted at different heights on each respective spindle, and the blades at each spindle have different lengths. Horizontal clearance is provided between the lower blades, and the cutting circle of one of the upper blades overhangs the clearance zone between the lower blades, so that any grass missed between the lower blades is cut by the overhanging upper blade.

25 Claims, 8 Drawing Sheets

MULTI-BLADE LAWN MOWER CUTTING SYSTEM WITH OVERLAPPING CUTTING CIRCLES

BACKGROUND OF THE INVENTION

Power lawn mowers are widely used to maintain and enhance the appearance of turf grass and other vegetation. In one simple arrangement, a generally rectangular blade is rotated in a horizontal plane at the desired cutting height. The blade sweeps out a circle, and sharpened cutting zones on the leading edges of the blade cut the grass at the desired height as the entire mower travels across the lawn. The blade may also include raised "wings" on its trailing edges, to lift the grass as it is cut by the sharpened edges. In a single-blade mower, the blade may typically be about three inches across and 18-24 inches long, so that the mower cuts a swath about 18-24 inches wide. The blade may be turned by a motor such as a gasoline or electric motor, and in some mowers, power from the motor is also be used to propel the mower itself. Often, the blade is attached directly to the vertical shaft of the motor.

While such a narrow swath may be satisfactory for cutting small areas, it is often desirable for a mower to cut a wider swath, to reduce the time required to mow a larger area. Because various difficulties arise when a mower blade exceeds about 24 inches, multi-blade mowers have been developed. In a typical multi-blade mower, multiple blades rotate on spaced-apart spindles, each spindle having a single blade mounted thereon, and are transported in parallel across the lawn. The blades of conventional multi-blade mowers are oriented in the same plane and are commonly offset or timed to provide horizontal overlap between the blade swaths. The blades cut an overall swath that approaches the sum of the lengths of the blades, less the overlap necessary to ensure that no gaps exist in the cut swath. That is, a two-blade mower may cut a swath just under twice the width of a mower having a single blade of the same length as each of the two blades. A multiple-blade mower thus achieves improved cutting productivity, while avoiding the difficulties of longer blades. The blades are typically housed within a single deck that has internal baffling that works to minimize conflicting airflow between adjacent blades and also to direct and expedite the discharge of cut clippings from within the deck.

There is a need for improved multi-blade mowers.

BRIEF SUMMARY OF THE INVENTION

According to one aspect, a multi-blade mower comprises first and second spindles spaced apart from each other by a distance. A first lower blade and a first upper blade are mounted to the first spindle. The first upper blade is mounted higher than the first lower blade, and the first upper blade is longer than the first lower blade and sweeps out a larger circle than the first lower blade sweeps out during rotation. A second lower blade and a second upper blade are mounted to the second spindle. The second lower blade is at the same height as the first lower blade, the second upper blade is mounted higher than the second lower blade, and the second upper blade is shorter than the second lower blade and sweeps out a smaller circle than the second lower blade sweeps out during rotation. The circles swept out by the first and second lower blades do not overlap, and the circles swept out by the first upper blade and the second lower blade do overlap, as viewed from above the mower. In some embodiments, the first and second spindles are not timed in relation to each other. In some embodiments, the first lower blade and the first upper blade are held in fixed relation to each other such that the first lower and first upper blades rotate together on the first spindle, and the second lower blade and the second upper blade are held in fixed relation to each other such that the second lower and second upper blades rotate together on the second spindle. Each of the first and second upper blades may lead its respective lower blade in rotation. In some embodiments, each of the first and second lower blades is flat and comprises at least one cutting zone on a respective leading edge. In some embodiments, each of the first and second upper blades comprises at least one raised fan wing and at least one cutting zone on a respective leading edge. In some embodiments, each of the first and second lower blades is flat and comprises at least one cutting zone on a respective leading edge, and each of the first and second upper blades comprises at least one raised fan wing and comprises at least one cutting zone on a respective leading edge. In some embodiments, the heights of the first and second upper blades are equal, and the circles swept out by the first and second upper blades do not overlap, as viewed from above the mower. The first and second spindles may be held with their rotational axes in fixed parallel relation to each other. The first and second spindles may be positioned on an axis that is perpendicular to a nominal direction of travel of the mower. In some embodiments, the multi-blade mower further comprises a prime mover and a drive mechanism that cooperate to rotate the first and second spindles. The first lower blade and the second lower blade may be of unequal lengths. The first upper blade and the second upper blade may be of unequal lengths.

In some embodiments, the multi-blade mower further comprises a third spindle spaced apart from the first and second spindles; and a third lower blade and a third upper blade mounted to the third spindle, the third upper blade being mounted higher than the third lower blade; wherein the third lower and third upper blades have differing lengths and are positioned such that they interact during rotation with the first lower and first upper blades or with the second lower and second upper blades in the same manner as the interaction of the first lower and first upper blades with the second lower and second upper blades.

According to another aspect, a multi-blade mower comprises first and second spindles spaced apart from each other by a distance. A first blade is mounted to the first spindle at a height, and the first blade comprises at least one cutting zone on a leading edge and the first blade has a first length such that the first blade sweeps out a circle having a first radius when the first blade rotates on the first spindle. The multi-blade mower further comprises a second blade mounted to the second spindle at the same height as the first blade. The second blade comprises at least one cutting zone on a leading edge and the second blade has a second length such that the second blade sweeps out a circle having a second radius when the second blade rotates on the second spindle. The sum of the first and second radii is less than the distance between the first and second spindles. The multi-blade mower further comprises a third blade mounted to the first spindle. The third blade comprises at least one cutting zone on a leading edge and is displaced vertically from the first blade, and extends beyond an end of the first blade such that the third blade sweeps out a circle having a third radius when the third blade rotates on the first spindle. The sum of the second and third radii is larger than the distance between the first and second spindles such that the circle swept out by the third blade overlaps the circle swept out by the second blade as viewed from above the mower. The height of the third blade is sufficiently different from the height of the second blade that the third blade and the second blade do not contact each other regardless of the angular positions of the first and second spindles. In some embodiments, the first and second spindles are not timed in relation to each other. In some embodiments, the third blade is mounted to the first spindle in fixed relation to the first blade such that the first and third blades rotate together on the first spindle. The third blade may extend beyond both ends of the first blade. The first and second spindles may be positioned on an axis that is perpendicular to a nominal direction of travel of the mower. The rotational axes of the first and second spindles may be fixed in parallel relation to each other. In some embodiments, the multi-blade mower further comprises a fourth blade mounted on the second spindle, wherein the fourth blade comprises at least one cutting zone at a leading edge, wherein the fourth blade is displaced vertically from the second blade, wherein the fourth blade has a length shorter than the length of the second blade such that the fourth blade sweeps out a circle having a fourth radius when the fourth blade rotates on the second spindle, and wherein the sum of the third and fourth radii is smaller than the distance between the first and second spindles. In some embodiments, the fourth blade is mounted in fixed relation to the second blade such that the second and fourth blades rotate together on the second spindle. In some embodiments, each of the third and fourth blades comprises at least one raised fan wing, and the third blade leads the first blade in rotation, and the fourth blade leads the second blade in rotation. In some embodiments, the multi-blade mower further comprises a prime mover and a drive system that cooperate to rotate the first and second spindles.

According to another aspect, a dual-height lawn mower blade assembly comprises a lower blade having a first length, two coplanar end portions, and an offset portion between the two end portions, the offset portion being planar, parallel to the planar end portions, and displaced from the planar end portions by a first displacement distance. The assembly further comprises an upper blade having second length, two coplanar end portions, and an offset portion between the two end portions, the offset portion being planar, parallel to the planar end portions, and displaced from the planar end portions by a second displacement distance. The offset portion of the lower blade is disposed against the offset portion of the upper blade and the first offset distance is larger than the second offset distance, such that vertical clearance is provided between the end portions of the lower blade and the end portions of the upper blade. The sides of the offset portion of the upper blade are angled with respect to the longitudinal axis of the upper blade, such that the rotation of the lower blade with respect to the upper blade is constrained by sides of the offset portion of the upper blade. In some embodiments, the upper blade includes raised fan wings at its ends. In some embodiments, the upper and lower blades are of different lengths.

DETAILED DESCRIPTION OF THE INVENTION

In multi-blade mowers, it is desirable to maximize cutting area and to ensure complete cutting of the lawn while avoiding collisions between the multiple blades. To avoid blade collisions, there should be absolute clearance between adjacent blades. The nominal design should provide enough clearance to accommodate manufacturing tolerances in spindle positioning and blade lengths, distortion of the mower deck during use, and other factors, so that clearance always exists between the blades. Unless addressed, this running clearance results in a gap between the blade tips that can allow grass encountered at the point of blade path intersection to "slide through" and remain uncut, resulting in an unacceptable cut quality and appearance.

To avoid leaving grass uncut in this way, many multiple spindle cutting deck designs position the blade spindles farther apart than the blade length, so that the blades cannot reach each other regardless of their rotational positions. The lateral mounting axis of the spindles is then intentionally skewed to create overlapping blade tip circles between adjacent spindles as viewed from the mower's direction of travel. That is, one blade trails the other in the direction of mower travel, and is inset toward the mower center line in relation to the other blade.

Figure 1:
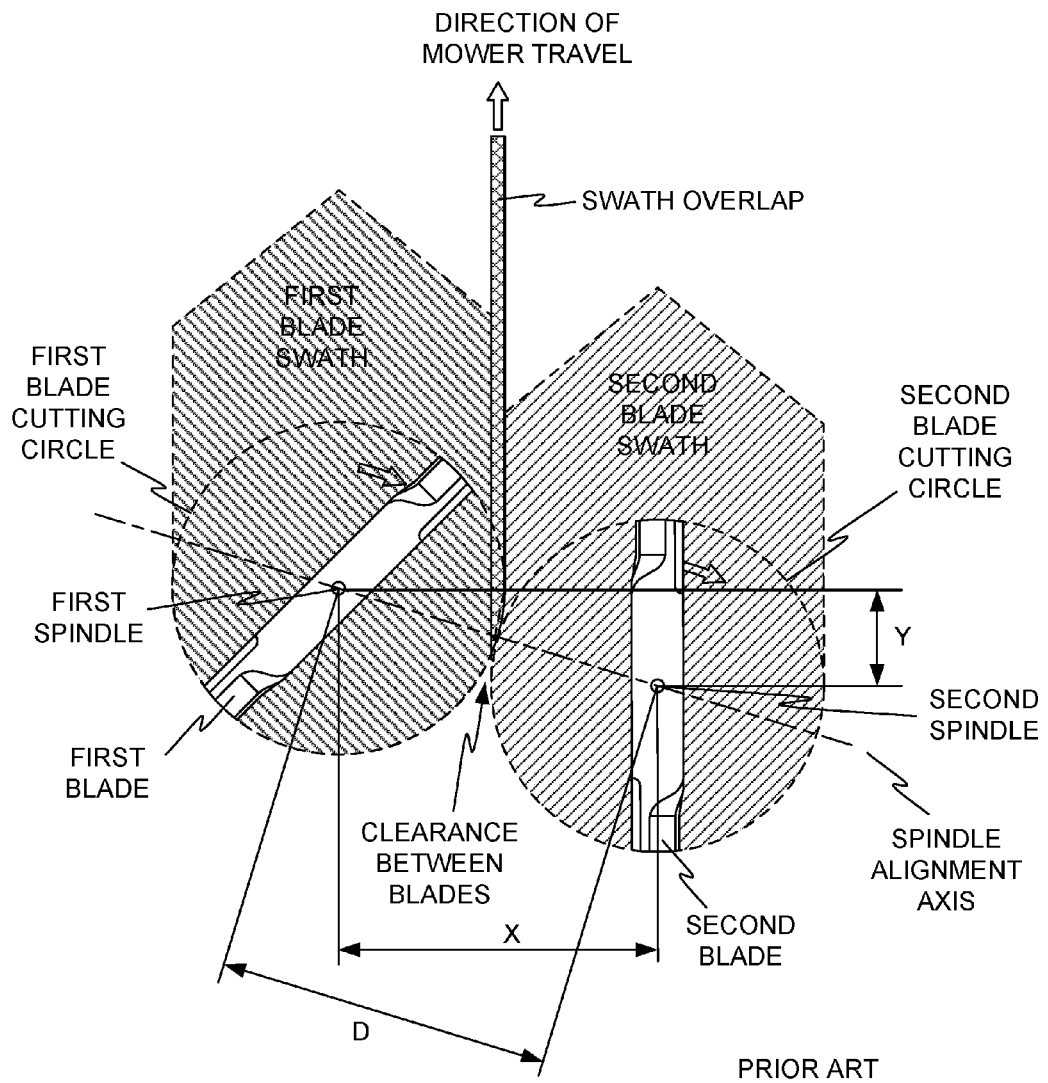
FIG. 1 illustrates a prior art multi-blade mower having skewed spindles.

An example of skewed spindles is shown in FIG. 1. Two blades turn on respective spindles, and are at the same height relative to level ground. The two spindles are spaced from each other by a distance D sufficient to leave absolute clearance between the two blades. However, the spindles are placed on an alignment axis that is skewed with respect to the direction of mower travel, so that in the direction transverse to the mower travel, the spindles are spaced by distance X, and the second spindle trails the first by distance Y. Thus, the swaths cut by the two blades overlap as the mower moves.

In another arrangement, some mowers position the spindles closer together than the blade length, and ensure that the blades never collide by synchronizing or "timing" the rotation of adjacent blades in relation to each other. Thus, the cutting circles of the blades overlap, even if the spindles are not skewed in relation to the direction of travel. Typically, the blades are driven using cogged pulleys and toothed belts to avoid slippage of the pulleys with respect to each other on the belt, or a gear box is placed at each spindle and the gear boxes are coupled together in a fixed-ratio relationship.

Figure 2:
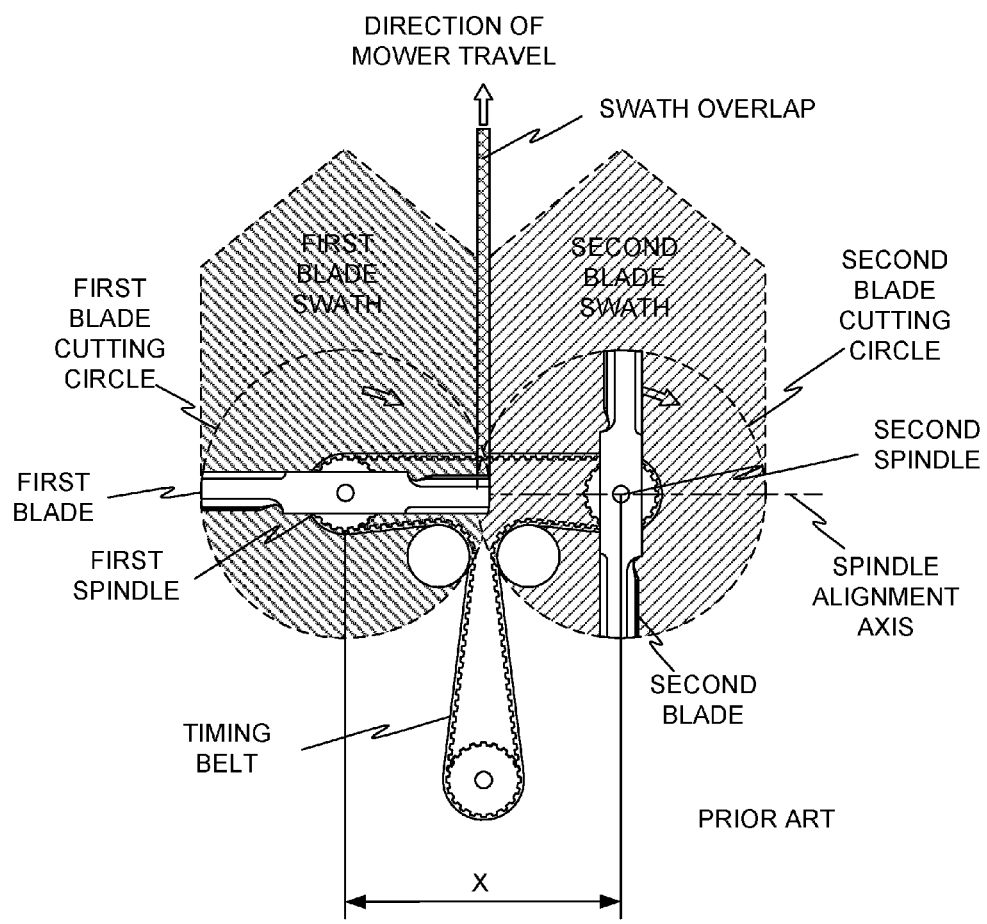
FIG. 2 illustrates a prior art multi-blade mower having timed spindles.

An example of timed blades is shown in FIG. 2. Again, two blades turn on respective spindles, and are at the same height relative to level ground. However, in FIG. 2, the spindles are placed on an axis that is not skewed with respect to the mower travel direction, but is transverse to it. The spindles are spaced apart by distance X, which is not sufficient to guarantee clearance between the blades. Rather, the blades are timed with respect to each other, using a timing belt and cogged pulleys, so that only one blade tip at a time can exist within the area of the blade circle overlap. Thus, the swaths cut by the two blades overlap, and the system relies on the timing mechanism to ensure that the blades do not collide.

Embodiments of the invention provide swath overlap in a novel way, using at least one additional blade displaced vertically from another of the cutting blades.

Figure 3:
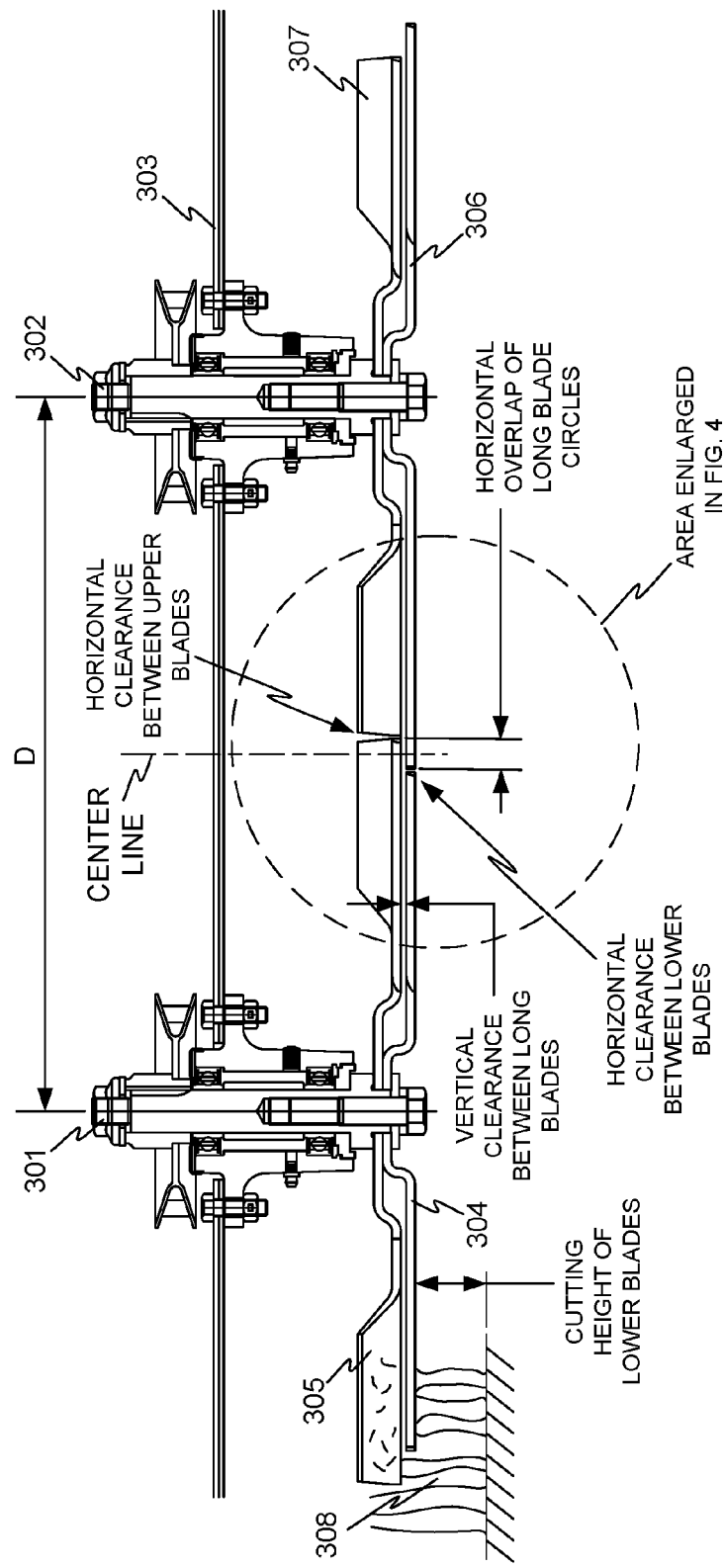
FIG. 3 illustrates a mower blade arrangement in accordance with embodiments of the invention, as viewed along the direction of travel of the mower.
Figure 4:
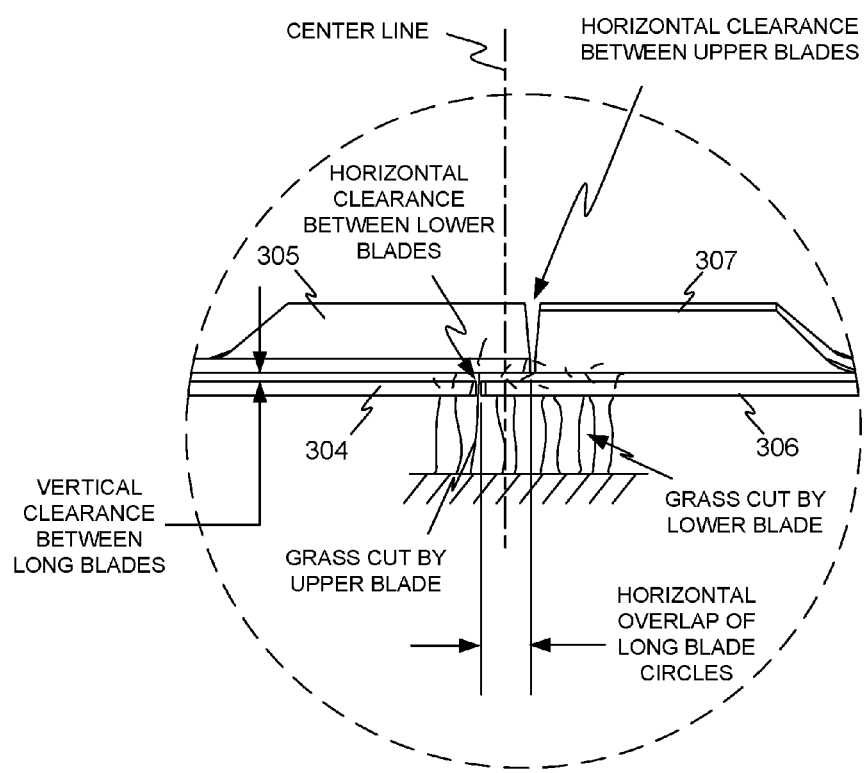
FIG. 4 shows an enlarged view of a portion of FIG. 3.

FIG. 3 illustrates a mower blade arrangement in accordance with some embodiments of the invention, as viewed along the direction of travel of the mower. FIG. 4 shows an enlarged view of a portion of FIG. 3. In the example of FIG. 3, a first spindle 301 and a second spindle 302 are spaced apart by a distance D. Spindles 301 and 302 are mounted to a mower deck 303, and turn on bearings.

In this example, four different blades are present, two mounted to each of spindles 301 and 302. A first lower blade 304 and a first upper blade 305 are mounted to and turn on first spindle 301. As can be seen in FIG. 3, first upper blade 305 is longer than first lower blade 304. (The blades on each spindle are shown in FIG. 3 as being aligned parallel with each other for ease of explanation, but this is not necessarily the case in practice. As is explained below in more detail, one blade on each axis may lead the other in rotation.) That is, the ends of first upper blade 305 overhang the ends of first lower blade 304, so that first upper blade 305 sweeps out a larger circle during rotation than does first lower blade 304.

A second lower blade 306 and a second upper blade 307 are mounted to and turn on second spindle 302. Second lower and upper blades 306 and 307 have the opposite length relationship from first lower and upper blades 304 and 305. As shown, second lower blade 306 is longer than second upper blade 307, such that second lower blade 306 sweeps out a larger circle during rotation than does second upper blade. In some embodiments the two longer blades (first upper blade 305 and second lower blade 306) may be equal in length, and the two shorter blades (first lower blade 304 and second upper blade 307) may be equal in length, but this is not a requirement.

Upper blades 305 and 307 are mounted higher than lower blades 304 and 306. For the purposes of this disclosure, blade height is the cutting height of the blade, for example as measured from the ground when the mower is resting on level ground. In the example of FIG. 3, first and second lower blades 304 and 306 are at the same height. As shown, first and second upper blades 305 and 307 are also mounted at the same height, but are mounted at a height higher than the height of the respective lower blades.

The circles swept out by lower blades 304 and 306 do not overlap. The lengths of lower blades 304 and 306 are such that the lower blades do not reach each other, regardless of the angular positions of the two lower blades. That is, there is absolute horizontal clearance between lower blades 304 and 306. Stated another way, each rotating blade sweeps out a circle having a respective radius, and the sum of radii of the circles swept out by lower blades 304 and 306 is smaller than the distance D between the spindles.

Similarly, the circles swept out by upper blades 305 and 307 do not overlap. The lengths of upper blades 305 and 307 are such that the upper blades do not reach each other, regardless of the angular positions of the two upper blades. That is, there is absolute horizontal clearance between upper blades 305 and 307. That is, the sum of radii of the circles swept out by upper blades 305 and 307 is also smaller than the distance D between the spindles.

However, the circles swept out by the two longer blades do overlap, as viewed from above the mower. That is, the circle swept out by first upper blade 305 overlaps with the circle swept out by second lower blade 306 as viewed from above the mower. Stated another way, the sum of the radii of the circles swept out by the two longer blades (first upper blade 305 and second lower blade 306) is greater that the distance D between the spindles. Vertical clearance is provided between the two long blades (first upper blade 305 and second lower blade 306) to avoid collisions between the longer blades. Clearance is provided between all of the blades, regardless of the relative angular positions of the blades in their respective rotations. As a result of the clearance of lower blades 304 and 306 and upper blades 305 and 307, it is unnecessary to orient the spindle axes in a skewed relationship, as shown in FIG. 1, or to time the blades, as described above in connection with FIG. 2. Thus, in some embodiments, the first and second spindles 301 and 302 are not timed with respect to each other. In other embodiments, the spindles may be timed, although the un-timed arrangement may be preferable, as it avoids the additional structure necessary to insure timing of the spindles.

For the purposes of this disclosure, for spindles to be "timed" in relation to each other means that measures are taken to ensure that the spindles maintain their relative angular positions. For example, the spindles may be driven by a toothed belt running on cogged pulleys, or may be driven by synchronized gears that prevent drift of the angular relationship between the spindles. In particular, driving two spindles using a simple V-belt is not considered to time the spindles. Even though two spindles driven with a simple V-belt may run for long periods with little or no change in their angular relationship, it is possible for the angular relationships to drift due to differences in pulley diameters, wear, slippage of the belt on the pulleys, and the like.

In the example of FIG. 3, the two lower blades cut the bulk of the grass to the cutting height of the lower blades. The small amount of grass that may slip through the horizontal gap between the lower blades without being cut by the lower blades is cut by first upper blade 305 at only a slightly higher cutting height, leaving only an inconsequential and unnoticeable slight irregularity in the cut height of the lawn, as is shown in FIG. 4.

The amount of horizontal and vertical clearance provided may be determined by the expected manufacturing tolerances of the blades, mower deck, spindles, and other mower components, and by the expected stresses that may deform the components during mowing. Preferably, the clearances are made large enough to guarantee that no blade collisions occur during normal operation, but small enough that no noticeable variation in cutting height of the lawn is visible. Although the dimensions and configurations of the blades may vary widely, in some optional embodiments, the longer blades may have a length from 12 to 36 inches, e.g., from 15 to 30 inches, or from 18 to 24 inches. In some embodiments, the shorter blades optionally have a length from 0.05 to 3 inches shorter than the longer blades, e.g., from 0.25 to 2 inches or from 0.5 to 1 inches shorter. The horizontal clearance between the lower blades and/or between the upper blades may be from 0.05 to 2 inches, e.g., from 0.10 to 1 inches or from 0.25 to 0.5 inches. In some embodiments, the vertical clearance between the lower and upper blades on a given spindle may be from 0.02 to 1 inches, e.g., from 0.05 to 0.5 inches or from 0.1 to 0.4 inches. For example, in one embodiment in which the longer blades are 17.375 inches long and the lower blades are 15.815 inches long, the nominal horizontal clearance between the lower blades is 0.030 inches, and the nominal vertical clearance between the lower and upper blades is 0.125 inches. Other blade lengths and clearance dimensions may be used as well.

It will be recognized that the placement of the blades on the two spindles is completely arbitrary. While FIG. 3 shows a shorter lower blade on spindle 301 and a longer lower blade on spindle 302, this arrangement could be reversed if desired.

Figure 5:
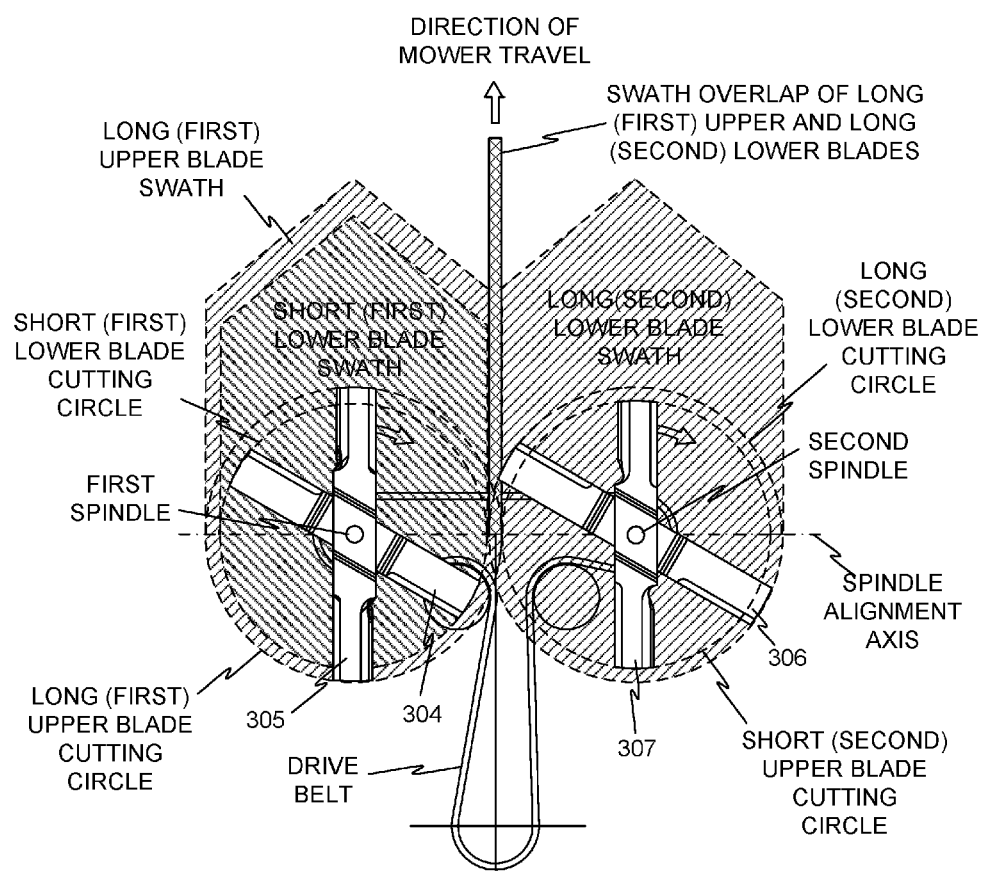
FIG. 5 shows the operation of the blade arrangement of FIG. 3, as viewed from above the mower.

FIG. 5 shows the operation of the blade arrangement of FIG. 3, as viewed from above the mower. An area of overlap exists between the swaths cut by first (long) upper blade 305 and second (long) lower blade 306. The blades may be driven by a prime mover, for example a gasoline or electric motor, through a drive belt, which may be for example a simple V-belt. In the example of FIG. 5, the spindles are placed on an axis that is transverse to the direction of travel of the mower, but this is not a requirement. In other embodiments, the axis on which the spindles are placed may be skewed with respect to the mower travel direction. The transverse axis design may be preferable, as it may allow production of a mower that is shorter in its travel direction than a mower using a skewed spindle mounting axis.

Figure 6:
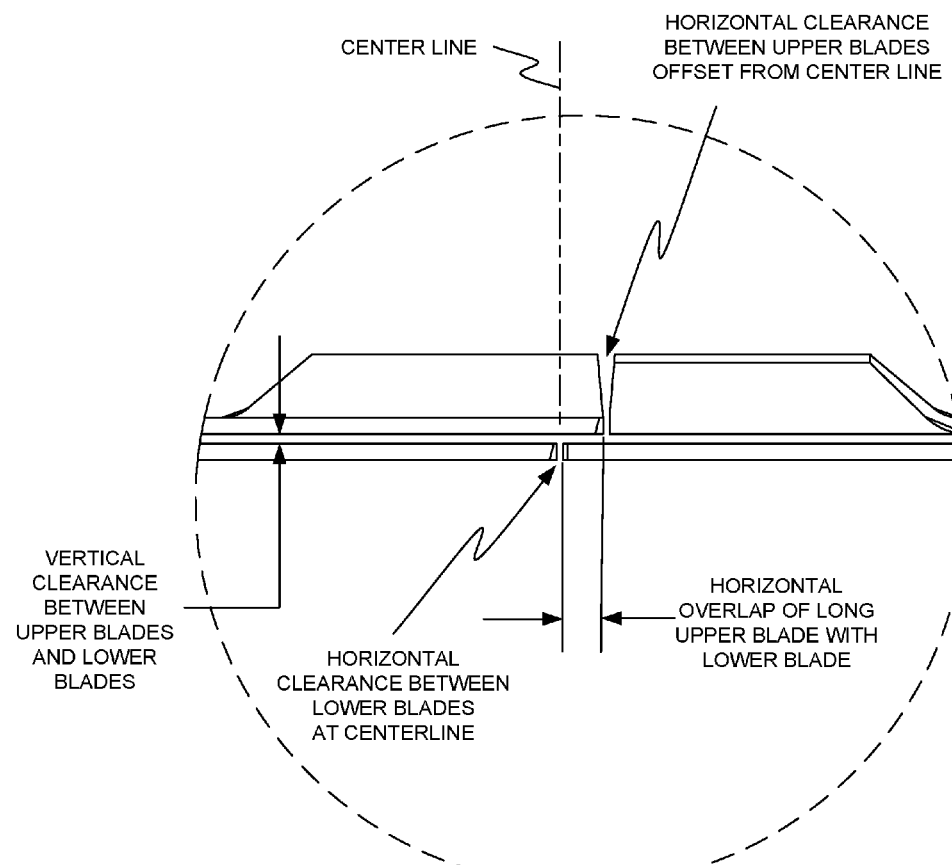
FIG. 6 shows an enlarged view of a blade interaction in a multi-blade mower in accordance with other embodiments.

In the example of FIGS. 3-5, the two long blades (first upper blade 305 and second lower blade 306) are equal in length, and the two short blades (first lower blade 304 and second upper blade 307) are equal in length, although this is not a requirement. In other embodiments, different lengths may be used. For example, FIG. 6 is similar to FIG. 4, and shows an enlarged view of the blade interaction in an embodiment in which the two lower blades are equal in length and the upper blades differ in length to provide the overlap between the longer upper blade and the gap between the lower blades. In the embodiment of FIG. 6, the lower blades are symmetrical about the mower center line, so that their point of closest approach is at the centerline. The upper blades still differ in length. As compared with the embodiment of FIG. 4, the embodiment of FIG. 6 may have the advantage that fewer unique blade types are used, as the two lower blades may be identical. Similarly, in other embodiments, the two upper blades may be made identical to each other, and the cutting overlap may be provided by lower blades of differing lengths.

As is also shown in FIG. 5, each set of lower and upper blades are fixed to each other, and rotate together on their respective spindles. The upper blades "lead" the lower blades in rotation, and may pre-cut the grass to one height before the final cut performed by the lower blades. This pre-cutting process may beneficially result in improved grass pulverization, which can facilitate grass deterioration over a shorter period of time. This arrangement, however, is also not required. In other embodiments, the lower blades may lead the upper blades. In still other embodiments, the upper and lower blades need not be fixed to each other, and need not rotate together, and in fact could rotate in opposite directions.

Figure 7:
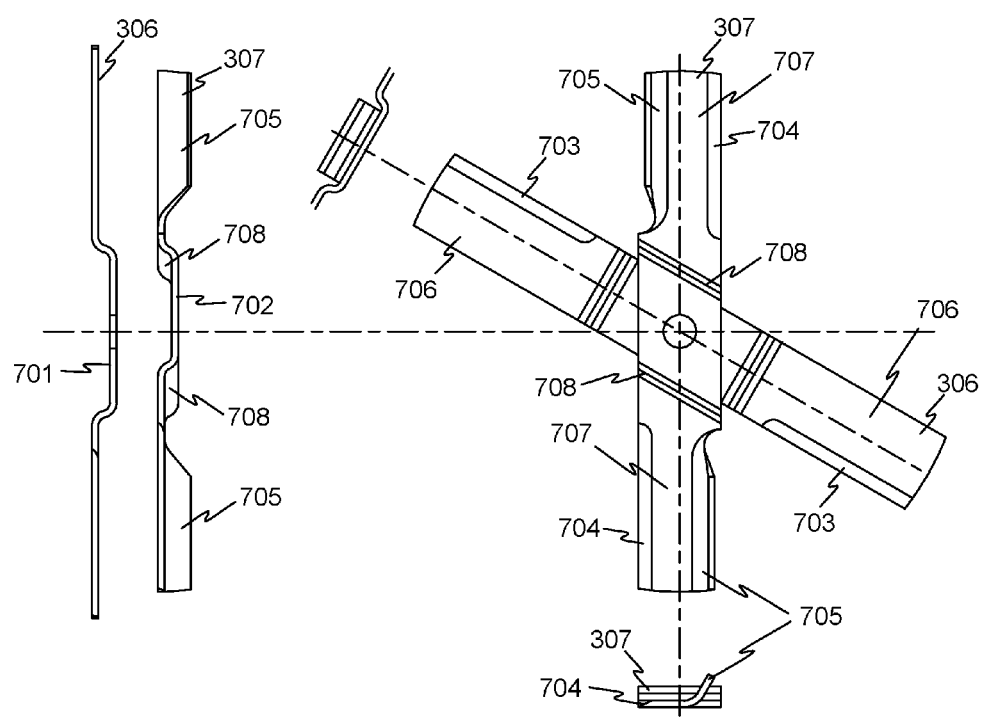
FIG. 7 illustrates an example way of fixing upper and lower mower blades to each other, in accordance with embodiments of the invention.

FIG. 7 illustrates one example way of fixing the upper and lower blades to each other, in accordance with some embodiments of the invention. While FIG. 7 illustrates the blade connection using the second lower and upper blades, a similar technique may be used for other blade sets. In this technique, lower blade 306 includes coplanar end portions 706 and an offset portion 701 between end portions 706. Offset portion 701 is planar and parallel to the planar end portions. Upper blade 307 includes two planar end portions 707 and an offset portion 702 between the end portions 707. Offset portion 701 is preferably deeper than offset portion 702, so that the ends of upper blade 307 are held above lower blade 306, providing the vertical clearance between them.

The sides 708 of offset portion 702 of upper blade 307 are at an angle to the longitudinal axis of upper blade 307 such that when the blades are assembled onto the spindle, offset portion 701 is disposed against offset portion 702, locking the blades from relative rotation.

Preferably, each lower blade such as blade 306 has at least one cutting zone 703 at a leading edge of blade 306. Two cutting zones 703 are shown in FIG. 7, on different leading edges, but more or fewer cutting zones may be present. Each cutting zone may be sharpened, for example by grinding, to form a cutting edge. Similarly, upper blade 307 may include one or more cutting zones 704.

In some embodiments, the upper blades such as upper blade 307 may include raised fan wings 705, to lift the grass for cutting and to facilitate discharge of cut grass clippings from the mower. The lower blades, such as lower blades 304 and 306 may lack any raised fan wings. For the purposes of this disclosure, a blade lacking raised fan wings is referred to as flat, even in the presence of raised mounting features such as offset portions 701 or 702.

In the embodiments described thus far, only two sets of blades are present, on two respective spindles. However, in other embodiments, three or more spindles may be present, for example a third spindle having a third lower blade and a third upper blade. The third lower and upper blades may interact with first upper and lower blades 304 and 305, or with second upper and lower blades 306 and 307, such that the mower has an even wider cutting width than the embodiment of FIG. 3, for example. The specific arrangement of the blade sets is arbitrary. For example, the center spindle may have its lower blade longer than its upper blade, with the outer spindles having longer upper and shorter lower blades. Or the center spindle may have its lower blade shorter than its upper blade, with the outer spindles having shorter upper and longer lower blades. In any event, the blades on the third spindle interact with either the blades on the first spindle or the second spindle, in a manner like the interaction of the blades on the first and second spindles. More than three spindles and blade sets may be provided, alternating in the placement of their respective longer and shorter blades.

Also in the embodiments described thus far, the two spindles are held with their rotational axes in a fixed parallel relation to each other, so that the lower blades turn in the same plane. The multi-blade mower is thus substantially rigid, and acts as a large flat cutter. In other embodiments, however, the spindles may be movable with respect to each other, to allow the mower deck to flex to conform to uneven ground. For example, a hinge may be provided having its axis horizontal, substantially parallel to the direction of mower travel, and intersecting the center line shown in FIG. 3 at about the average height of the blades, or at another suitable location. The vertical and horizontal clearances provided between the blades are preferably selected to accommodate the expected flexure of the mower deck without incurring blade collisions. The flexure of the deck may be mechanically limited in the interest of avoiding blade interference as well. A flexing deck may be especially advantageous when three or more spindles and blade sets are present, as the additional mower width increases the likelihood of encountering uneven ground in any particular swath.

It is also not necessary that all of the blade sets in a mower embodying the invention be of similar sizes. For example, in a multi-blade mower having three spindles and three blade sets, the middle blade set may sweep out a larger circle than either of the outer blade sets, or vice versa. For example, the middle blade set could include blades about 24 inches long (with the upper and lower blades being of somewhat different lengths), while the outer blade sets may be only about 18 inches in length. Any suitable combination of blade lengths may be used, and no two blade sets need be the same size.

In still other embodiments, other blade arrangements may be used. For example, referring to FIG. 3, second upper blade 307 may be omitted entirely. In another example, upper blades 305 and 307 may not be single elongated pieces. Instead, in some embodiments, the raised fan wings and additional cutting zones provided by the upper blades may be provided by short blade segments mounted to the respective lower blades by welds, rivets, bolts, or other techniques.

In one embodiment, the upper and lower blades may be removed from the mower and reinstalled in a reversed configuration in order to prolong the life of the blades and/or provide for even wear. Of course, if the blade positions are reversed in this manner it will likely be necessary to do the same with all spindles in order to ensure that that there is no blade contact between the blades on different spindles during normal usage. If the upper and lower blades are attached to one another, the configuration may still be reversible, but it may be necessary to provide cutting zones on both the leading and trailing edge of the blades, since the trailing edge will become the leading edge after the integrated blade assembly has been reversed (assuming the same direction of blade rotation). In addition, in the latter embodiment, it may be necessary for any integrated raised fan wings to be provided in a separate optionally non-cutting blade higher than the other blades or to provide the ability to remove and reinstall any fan wings to ensure they are in the proper orientation for normal usage.

It will be understood that the principles of the invention may be embodied in walk-behind mowers, self-propelled walk-behind mowers, riding mowers, standing mowers, pulled mowers, or other kinds of multi-blade mowers. A blade arrangement embodying the invention, such as those discussed above, is preferably enclosed in a mower deck, which may include baffling and other features to control air flow near the blades and to exhaust grass clippings.

Figure 8:
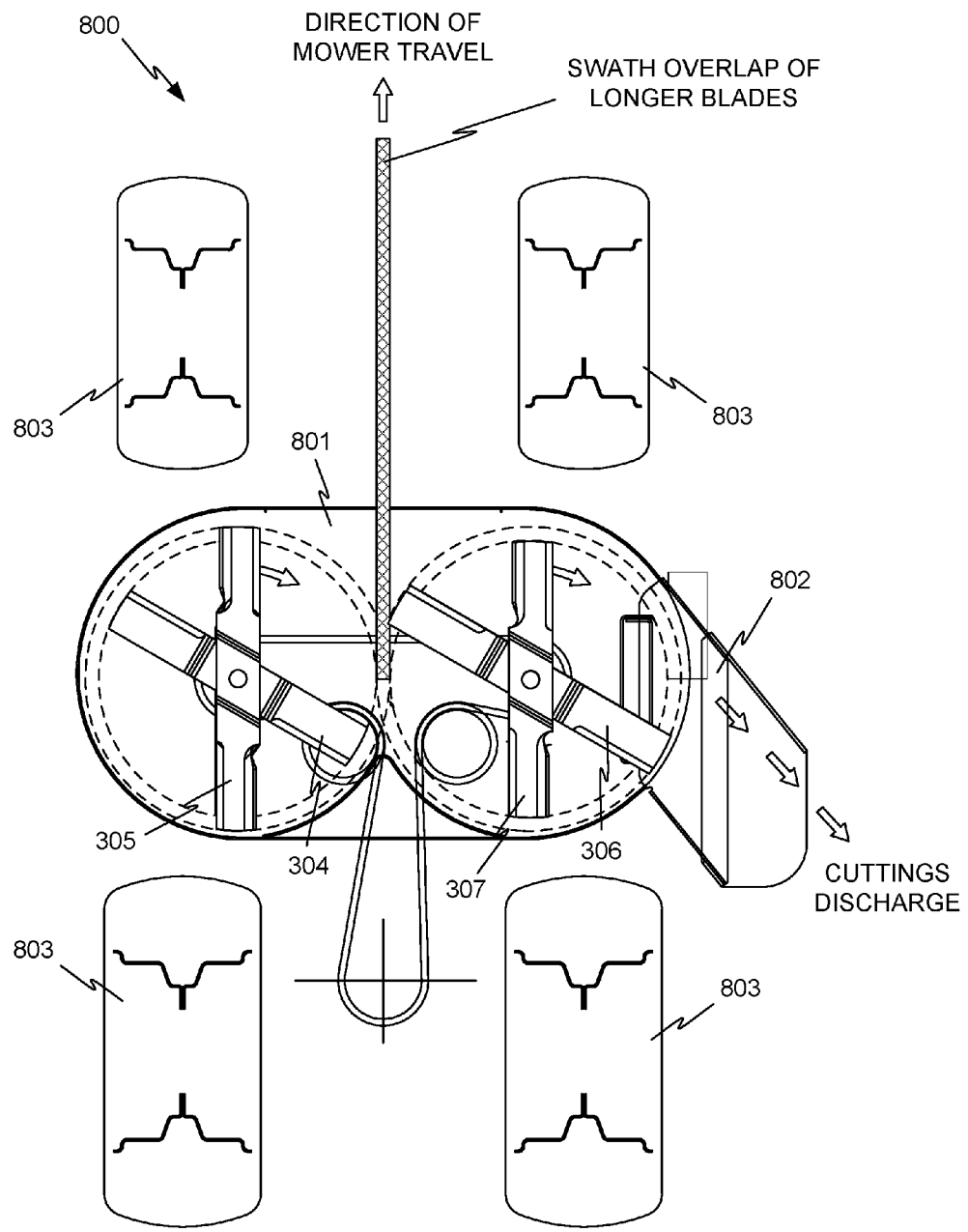
FIG. 8 shows a schematic overhead view of a riding mower according to embodiments of the invention.

FIG. 8 shows a schematic overhead view of a riding mower 800 according to some embodiments of the invention. Mower 800 includes a deck 801 housing blades 304, 305, 306, and 307 as discussed above. The deck includes an exhaust chute 802, and is carried by four wheels 803.

The invention has now been described in detail for the purposes of clarity and understanding. However, those skilled in the art will appreciate that certain changes and modifications may be practiced within the scope of the appended claims. It is to be understood that any workable combination of the features and capabilities disclosed above in the various embodiments is also considered to be disclosed.

What is claimed is:

1. A multi-blade mower, comprising:
    first and second spindles spaced apart from each other by a distance;
    a first lower blade and a first upper blade mounted to the first spindle, wherein the first upper blade is mounted higher than the first lower blade, and wherein the first upper blade is longer than the first lower blade and sweeps out a larger circle than the first lower blade sweeps out during rotation;
    a second lower blade and a second upper blade mounted to the second spindle, wherein the second lower blade is at the same height as the first lower blade, wherein the second upper blade is mounted higher than the second lower blade, and wherein the second upper blade is shorter than the second lower blade and sweeps out a smaller circle than the second lower blade sweeps out during rotation; and
    wherein the circles swept out by the first and second lower blades do not overlap, and the circles swept out by the first upper blade and the second lower blade do overlap, as viewed from above the mower.

2. The multi-blade mower of claim 1, wherein the first and second spindles are not timed in relation to each other.

3. The multi-blade mower of claim 1, wherein:
    the first lower blade and the first upper blade are held in fixed relation to each other such that the first lower and first upper blades rotate together on the first spindle; and
    the second lower blade and the second upper blade are held in fixed relation to each other such that the second lower and second upper blades rotate together on the second spindle.

4. The multi-blade mower of claim 3, wherein each of the first and second upper blades leads its respective lower blade in rotation.

5. The multi-blade mower of claim 1, wherein each of the first and second lower blades is flat and comprises at least one cutting zone on a respective leading edge.

6. The multi-blade mower of claim 1, wherein each of the first and second upper blades comprises;
    at least one raised fan wing; and
    at least one cutting zone on a respective leading edge.

7. The multi-blade mower of claim 1, wherein:
    each of the first and second lower blades is flat and comprises at least one cutting zone on a respective leading edge; and
    each of the first and second upper blades comprises at least one raised fan wing and comprises at least one cutting zone on a respective leading edge.

8. The multi-blade mower of claim 1, wherein the heights of the first and second upper blades are equal, and the circles swept out by the first and second upper blades do not overlap, as viewed from above the mower.

9. The multi-blade mower of claim 1, wherein the first and second spindles are held with their rotational axes in fixed parallel relation to each other.

10. The multi-blade mower of claim 1, wherein the first and second spindles are positioned on an axis that is perpendicular to a nominal direction of travel of the mower.

11. The multi-blade mower of claim 1, further comprising a prime mover and a drive mechanism that cooperate to rotate the first and second spindles.

12. The multi-blade mower of claim 1, wherein the first lower blade and the second lower blade are of unequal lengths.

13. The multi-blade mower of claim 1, wherein the first upper blade and the second upper blade are of unequal lengths.

14. The multi-blade mower of claim 1, further comprising:
    a third spindle spaced apart from the first and second spindles; and
    a third lower blade and a third upper blade mounted to the third spindle, the third upper blade being mounted higher than the third lower blade;
    wherein the third lower and third upper blades have differing lengths and are positioned such that they interact during rotation with the first lower and first upper blades or with the second lower and second upper blades in the same manner as the interaction of the first lower and first upper blades with the second lower and second upper blades.

15. A multi-blade mower, comprising:

first and second spindles spaced apart from each other by a distance;

a first blade mounted to the first spindle at a height, the first blade comprising at least one cutting zone on a leading edge and the first blade having a first length such that the first blade sweeps out a circle having a first radius when the first blade rotates on the first spindle;

a second blade mounted to the second spindle at the same height as the first blade, the second blade comprising at least one cutting zone on a leading edge and the second blade having a second length such that the second blade sweeps out a circle having a second radius when the second blade rotates on the second spindle, wherein the sum of the first and second radii is less than the distance between the first and second spindles;

a third blade mounted to the first spindle, the third blade comprising at least one cutting zone on a leading edge and being displaced vertically from the first blade and extending beyond an end of the first blade such that the third blade sweeps out a circle having a third radius when the third blade rotates on the first spindle, wherein the sum of the second and third radii is larger than the distance between the first and second spindles such that the circle swept out by the third blade overlaps the circle swept out by the second blade as viewed from above the mower, the height of the third blade being sufficiently different from the height of the second blade that the third blade and the second blade do not contact each other regardless of the angular positions of the first and second spindles; and a fourth blade mounted on the second spindle, wherein the fourth blade comprises at least one cutting zone at a leading edge, wherein the fourth blade is displaced vertically from the second blade, wherein the fourth blade has a length shorter than the length of the second blade such that the fourth blade sweeps out a circle having a fourth radius when the fourth blade rotates on the second spindle, and wherein the sum of the third and fourth radii is smaller than the distance between the first and second spindles.

16. The multi-blade mower of claim 15, wherein the first and second spindles are not timed in relation to each other.

17. The multi-blade mower of claim 15, wherein the third blade is mounted to the first spindle in fixed relation to the first blade such that the first and third blades rotate together on the first spindle.

18. The multi-blade mower of claim 15, wherein the third blade extends beyond both ends of the first blade.

19. The multi-blade mower of claim 15, wherein the first and second spindles are positioned on an axis that is perpendicular to a nominal direction of travel of the mower.

20. The multi-blade mower of claim 15, wherein the rotational axes of the first and second spindles are fixed in parallel relation to each other.

21. The multi-blade mower of claim 15, wherein the fourth blade is mounted in fixed relation to the second blade such that the second and fourth blades rotate together on the second spindle.

22. The multi-blade mower of claim 21, wherein each of the third and fourth blades comprises at least one raised fan wing, and wherein the third blade leads the first blade in rotation, and the fourth blade leads the second blade in rotation.

23. The multi-blade mower of claim 15, further comprising a prime mover and a drive system that cooperate to rotate the first and second spindles.

24. The multi-blade mower of claim 1, wherein:

the first lower blade comprises two coplanar end portions and an offset portion between the two end portions, the offset portion being planar, parallel to the planar end portions, and displaced from the planar end portions by a first displacement distance;

the first upper blade comprises two coplanar end portions and an offset portion between the two end portions, the offset portion being planar, parallel to the planar end portions, and displaced from the planar end portions by a second displacement distance; and the offset portion of the lower blade is disposed against the offset portion of the upper blade and the first displacement distance is larger than the second displacement distance, such that vertical clearance is provided between the end portions of the lower blade and the end portions of the upper blade.

25. The multi-blade mower of claim 24, wherein the sides of the offset portion of the upper blade are angled with respect to the longitudinal axis of the upper blade, such that the rotation of the lower blade with respect to the upper blade is constrained by sides of the offset portion of the upper blade.

* * * * *